United States Patent
Ramsey et al.

(10) Patent No.: US 8,466,706 B2
(45) Date of Patent: Jun. 18, 2013

(54) SOLAR COMBINER WITH INTEGRATED STRING CURRENT MONITORING

(75) Inventors: James Raymond Ramsey, Murfreesboro, TN (US); Jeffrey Owen Sharp, Lexington, KY (US)

(73) Assignee: Schneider Electric USA, Inc., Palatine, IL (US)

( * ) Notice: Subject to any disclaimer, the term of this patent is extended or adjusted under 35 U.S.C. 154(b) by 493 days.

(21) Appl. No.: 12/857,778

(22) Filed: Aug. 17, 2010

(65) Prior Publication Data
US 2012/0043988 A1  Feb. 23, 2012

(51) Int. Cl.
*G01R 31/26* (2006.01)

(52) U.S. Cl.
USPC .................... 324/761.01; 136/244; 702/64

(58) Field of Classification Search
USPC .................... 324/761.01; 136/244; 702/64
See application file for complete search history.

(56) References Cited

U.S. PATENT DOCUMENTS

| | | | |
|---|---|---|---|
| 5,416,470 | A | 5/1995 | Tanaka et al. |
| 7,602,080 | B1 | 10/2009 | Hadar et al. |
| 2004/0211456 | A1 | 10/2004 | Brown et al. |
| 2006/0162772 | A1 | 7/2006 | Presher, Jr. et al. |
| 2006/0237058 | A1 | 10/2006 | McClintock et al. |
| 2009/0132302 | A1 | 5/2009 | Beekhuis |
| 2009/0207543 | A1* | 8/2009 | Boniface et al. ............... 361/86 |
| 2009/0222224 | A1* | 9/2009 | Lewis et al. .................... 702/64 |
| 2009/0302680 | A1* | 12/2009 | Kernahan et al. ............. 307/43 |
| 2010/0085670 | A1 | 4/2010 | Palaniswami et al. |

FOREIGN PATENT DOCUMENTS
WO    2011/016441 A1    2/2011

OTHER PUBLICATIONS

Fat Spaniel Technologies; String Monitoring for Solar Electric Systems: Detect Faults, Maximize Output; dated 2007 (2 pages).
RECtrack DC Monitoring Combiner Box brochure; Energy Recommerce Inc.; dated 2008 (2pages).
Written Opinion corresponding to co-pending International Patent Application Serial No. PCT/US2010/046939, European Patent Office, dated Nov. 16, 2011; (7 pages).
International Search Report corresponding to co-pending International Patent Application Serial No. PCT/US2011/046939, European Patent Office, dated Jan. 20, 2011; (4 pages).

* cited by examiner

*Primary Examiner* — Arleen M Vazquez
(74) *Attorney, Agent, or Firm* — Nixon Peabody LLP

(57) ABSTRACT

A combiner that calculates energy produced by each panel feed during the daytime, and calculates a resistance value needed to calculate the energy by injecting a known current into each panel feed at nighttime and measuring the resulting voltage across a resistive element in each panel feed. A voltage tap across the protection device in each panel feed allows logic and control circuitry to measure the voltage across each protection device. At nighttime, a known current is injected into each panel feed and the voltage across each protection device is measured. Plugging the current and voltage into Ohm's Law, a resistance of each protection device is calculated, then that resistance value is used during the daytime to calculate energy produced by each string in real time and to monitor each string's performance. When an individual string's performance wanes, an alarm is indicated to help the operator troubleshoot which individual panel(s) within the string is responsible for that string's underperformance.

26 Claims, 5 Drawing Sheets

US 8,466,706 B2

SOLAR COMBINER WITH INTEGRATED STRING CURRENT MONITORING

FIELD OF THE INVENTION

Aspects of the present disclosure relate generally to solar combiners, and, more particularly, to solar combiners with integrated current monitoring on an individual string basis.

BACKGROUND

A solar photovoltaic (PV) array is a parallel arrangement of strings of series-connected PV panels. A string in the context of PV arrays is an arrangement of PV panels connected together in series. A PV array is composed of multiple strings of PV panels. Each string output is received in a device called a combiner, which "combines" the current from each string into a larger conductor, called a busbar, for feeding downstream equipment such as disconnect switches, possibly other lower-level combiners, and ultimately to a DC-to-AC inverter that converts the DC currents produced by each string of the PV array into a corresponding AC current. The combiner can receive strings from one or more PV arrays.

In the combiner, which typically takes the form of an enclosure, circuit breakers or fuses are used to limit backfeeding current from one or more strings into another. Backfeeding current into a PV panel can damage the wiring panel or otherwise adversely affect the performance of the PV array.

Individual strings connected to the combiner can underperform for one of several reasons, including the presence of a ground fault in the string, a loose wire in the string, solar tracking of the PV panel is misadjusted, and so forth. As will be appreciated solar PV arrays can occupy extensive surface areas. A typical PV system might contain multiple PV arrays and dozens or even hundreds of PV panels.

Conventional software in the DC-to-AC inverter can indicate a drop in performance of the PV array as a whole, but the inverter has no way of knowing which PV array is underperforming or has a problem let alone which individual string is underperforming or has a problem. To troubleshoot which individual string might be the source of the problem involves manual labor and extensive troubleshooting of the entire array until the source of the problem is found. If an underperforming or troublesome string goes unnoticed, is ignored, or is undetected, a substantial decrease in power generation and a loss of revenue can occur. More seriously, if the problem is caused by a loose wire connection or a ground fault, a hazardous condition can persist creating a potentially dangerous condition depending on the installation of the string, such as on a building or in other areas where humans can be present.

BRIEF SUMMARY

What is disclosed herein is a solar combiner that can calculate the energy produced by each string and monitor the performance of each string without requiring any current transformers, without requiring any modification to the PV panels or to the DC-AC inverter, and without significantly adding complexity to existing solar combiners. A specific example will be discussed in this summary, though it should be understood that the present disclosure is not limited to this specific example.

Existing solar combiners use fuses, circuit breakers, or other protection devices to limit backfeeding current from multiple strings into a defective string, and each of these protection devices has a resistance, which can vary slightly from device to device. These protection devices are typically coupled to a common busbar that feeds the collective current from all the panel feeds to a common terminal to which the DC-AC inverter is connected. Thus, to obtain an accurate resistance of each protection device, one additional voltage line is needed to measure the voltage across the protection device, and this voltage line is fed to logic and control circuitry, which converts the voltage measurements into corresponding resistance values. If the protection devices are arranged on a printed circuit board, only a few additional traces need to be added to the printed circuit board to tap the voltage across each protection device (the other tap being taken from the common busbar). No additional components are needed along each panel feed. If common DIN rail fuseholders are used, then a voltage tap can be made on the input side of the protection device.

A current source is configured to inject a known quantity of current into each of the panel feeds. Using the known current and the measured voltage, the resistance of the protection device in each panel feed can be calculated using Ohm's Law. The current source is controlled by an algorithm, which waits until nighttime to inject the current and read the resulting measured voltages. The algorithm stores the calculated resistance values, and uses these resistance values during daytime voltage measurements to calculate energy produced by each panel in real time.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Figure 1:
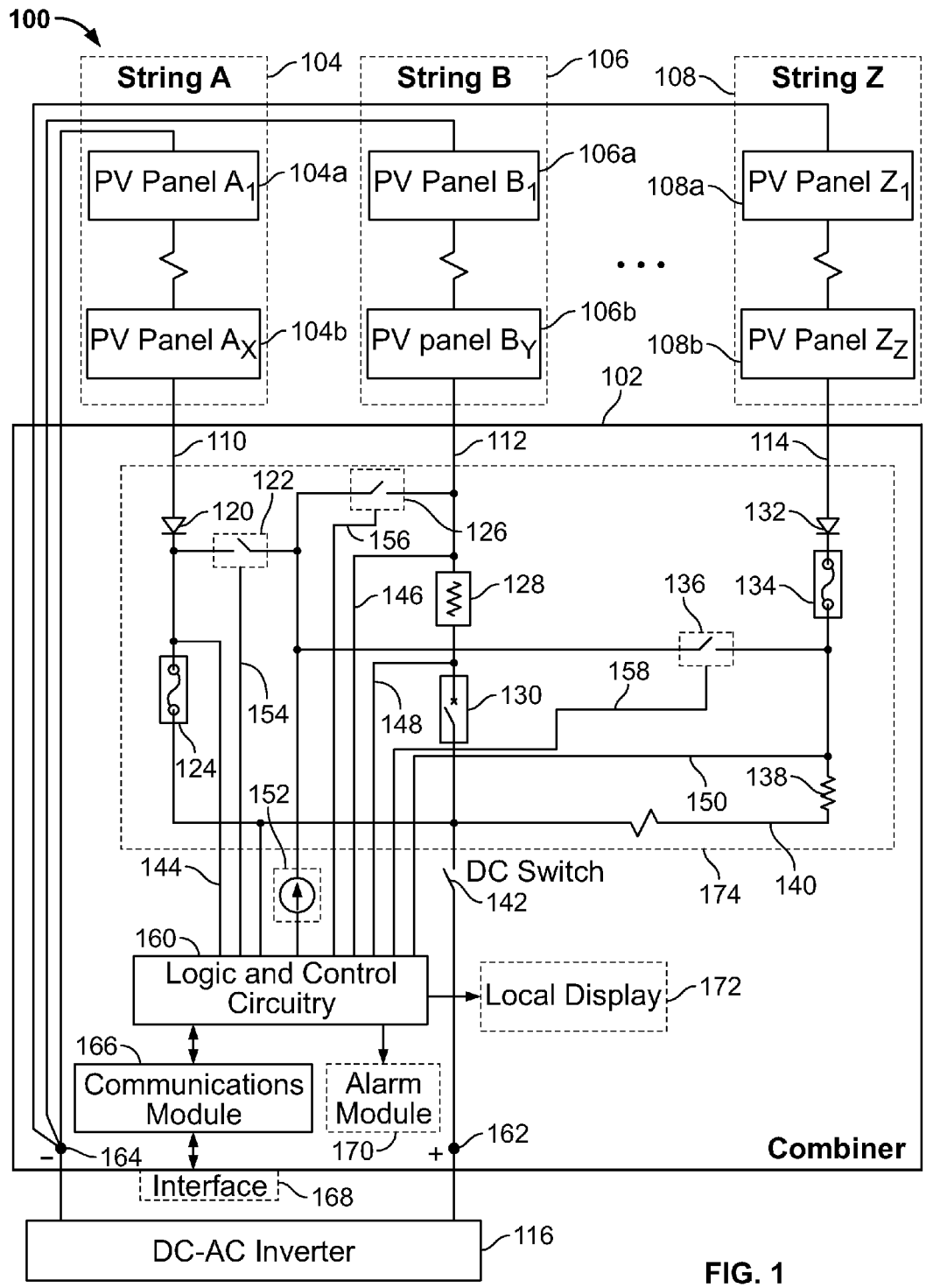
FIG. 1 is a functional block diagram of a photovoltaic (PV) array system or apparatus assembly that includes strings of series-connected PV panels that are connected to a corresponding panel feed in a first-level combiner box.

FIG. 1 is a functional block diagram of a photovoltaic (PV) array system or apparatus assembly 100 that includes strings (A, B . . . Z) 104, 106, 108 of series-connected PV panels (A1 . . . Ax, B1 . . . By, Z1 . . . Zz) 104a, 104b, 106a, 106b, 108a, 108b that are connected to a corresponding panel feed 110, 112, 114 in a first-level combiner box 102. Each PV panel conventionally includes an array of PV cells, which convert solar or other light energy into a corresponding DC current, which can be stored in a battery or other storage device and/or used to power DC or AC electrical loads. The combiner box 102 has an enclosure, such as a metal housing, that houses and protects components within the combiner box 102, such as against physical intrusion and environmental pollution. A combiner, in the context of the present disclosure, receives individual feeds of DC current from strings of PV panels and "combines" each of those DC currents onto a single conductor 140, typically called a busbar, that provides a DC current composed of each of the individual DC currents from each of the strings to a DC-to-AC inverter 116 or to a downstream combiner (not shown), which can combine DC current outputs from other first-level combiners that receive DC current directly from strings of PV panels. PV panels and combiners can be arranged in a hierarchical structure, with sets of panels feeding into first-level combiners and groups of first-level combiners feeding into downstream combiner(s), which ultimately feed into a DC-to-AC inverter, such as the inverter 116 shown in FIG. 1. Collectively, the strings of PV panels 104, 106, 108 make up a PV array, and the combiner 102 can receive strings from one or more than one PV array.

Structurally, the panel feeds 110, 112, 114 correspond to electrical conductors, and functionally, the panel feeds 110, 112, 114 carry DC current from each corresponding string 104, 106, 108. Basically, they feed DC current to the combiner 102, which combines the individual DC currents into a combined DC current for output to the DC-to-AC inverter 116.

FIG. 1 illustrates three different exemplary configurations within the combiner 102 showing different combinations of protection devices, resistive elements, and optional protection diodes in the path of the panel feed. As is apparent to those of ordinary skill in the art, each panel feed 110, 112, 114 can be configured the same way, but for ease of discussion, three different configurations are shown in FIG. 1 to illustrate in a single combiner different ways that the monitoring scheme can be implemented. A typical configuration is shown in the leftmost configuration with the voltage being tapped across a fuse element in the panel feed, but several other configurations can be implemented, which are shown in the middle and rightmost configurations.

In the leftmost configuration, the first panel feed 110 is connected to the first panel string A 104, which has a number, X, of PV panels 104a . . . b. An optional blocking diode 120 is connected in series to the first panel feed 110. As is known, the blocking diode 120 allows DC current to flow from the PV panels 104a, 104b into the first panel feed 110, but blocks reverse current from flowing back into the PV panels 104a, 104b, protecting those panels (and the other electrically coupled panels 106, 108) in the PV array system 100. An optional switch 122, such as a relay, is connected at the electrical node between the blocking diode 120 and the protection device 124 in the first panel feed 110. The purpose of this switch 122 will be described below. A protection device 124, in this example a fuse, is connected in series to the first panel feed 110 to prevent the first panel feed 110 from overheating in case of a problem in 110 such as a line to ground fault or + to − short.

In the middle configuration, the second panel feed 112 is connected to the second panel string B 106, which has a number, Y, of PV panels 106a . . . b. The number Y can be the same or different from the number X. In this middle configuration, no blocking diode is present in the path of the second panel feed 112. An optional switch 126, such as a relay, is connected to the second panel feed 112 at the electrical node to which the resistive element 128 is connected. The purpose of this switch 126 will be described below. A resistive element 128 is connected in series to the second panel feed 112. The resistive element 128 can be a circuit breaker, a protection diode, a printed circuit board trace, a defined length of an electrical conductor such as a wire, or a fuse, for example, or any other device having a resistance sufficient to cause a measurable voltage drop across the device. A protection device 130, in this example a circuit breaker, is connected in series to the resistive element 128. Like the fuse 124, the circuit breaker 130 trips in response to detection of a fault condition on the second panel feed 112, such as a short circuit or an overcurrent.

In the rightmost configuration, the last panel feed 114 is connected to the last panel string C 108, which has a number, Z, of PV panels 108a . . . b. The number Z can be the same or different from the numbers X and Y. An optional blocking diode 132 is connected in series to the last panel feed 114, which in turn is connected to a protection device 134, in this example a fuse like the fuse 124 shown in the path of the first panel feed 110. An optional switch 136, such as a relay, is connected to the protection device 134, and the purpose of the switch 136 will be described below. The switch 136 is connected at the electrical node between the protection device 134 and a resistor 138. Although the switches 122, 126, 136 are shown as being connected at an electrical node to which each of the respective the protection devices 124, 128, 138 is connected, alternately, the switches 122, 126, 136 can be incorporated into the logic and control circuitry 160, such as in the form of transistors, and configured to control the flow of current into each of the panel feeds 110, 112, 114.

As mentioned in the summary, an aspect of the present disclosure is that a voltage is monitored across a resistive element in each panel feed entering the combiner 102. For ease of discussion, three different configurations are shown in FIG. 1 for creating a voltage drop in each panel feed 110, 112, 114. In the panel feed 110, the fuse 124 operates as the resistive element. In the panel feed 112, the resistive element 128 can be a fuse, a blocking diode, or a circuit breaker, for example. In the panel feed 114, the resistor 138 operates as the resistive element. In all three configurations, a voltage drop is created across the resistive element, which can be measured and used as disclosed herein. Again, although three exemplary panel feeds 110, 112, 114 are shown, it is understood that a smaller or greater number of panel feeds can exist in the combiner 102, such as twenty five.

All of the panel feeds 110, 112, 114 feed into a common reference voltage line 140, which is typically in the form of a busbar. The fuse 124, the circuit breaker 130, and the resistor 138 are all connected to the common reference voltage line 140. As explained further below, the voltage on the line 140 provides a reference voltage for measuring the voltage across the corresponding resistive element 124, 138 in each respective panel feed 110, 112, 114. All of the individual DC currents present in each individual panel feed 110, 112, 114 are summed to produce a composite DC current representing the sum of all DC currents produced by the strings 104, 106, 108, collectively. This composite DC current is fed into a conventional DC switch 142, which provides a single safety shutoff for stopping the flow of current to the DC-AC inverter 116.

As mentioned above, the line 140 provides a common reference voltage for two of the three resistive elements 124, 138. In the case of the first panel feed 110, the other voltage is provided by a line 144 that is received by logic and control circuitry 160. The line 140 is received by the logic and control circuitry 160, and the voltage difference across the lines 140 and 144 is measured by the logic and control circuitry 160 and converted into a corresponding voltage value, as explained below in connection with FIG. 1. In the case of the second panel feed 112, the resistive element 128 is not directly connected to the line 140, so two voltage lines 146, 148 are needed to connect to the respective terminals of the resistive element 128 to measure the voltage across the resistive element 128 by the logic and control circuitry 160. Both voltage lines 146, 148 are received by the logic and control circuitry 160 for conversion into a corresponding voltage value as explained below in connection with FIG. 2. In the case of the last panel feed 114, the resistor 138 is connected directly to the line 140, so another voltage line 150 is connected to the resistor 138 as shown and to the logic and control circuitry 160. The voltage across the resistor 138 is determined by measuring the voltage difference across the lines 140, 150 in the logic and control circuitry 160.

The combiner 102 further includes an optional current source 152 configured to inject a known current into each one, some, or all of the panel feeds 110, 112, 114. The output of the current source 152 is connected to each of the panel feeds 110, 112, 114 such that the injected current can flow across each of the switches 122, 126, 136. Although one current source is shown 152 together with separate switches 122, 126, 136 in each of the panel feeds 110, 112, 114 for allowing all of the injected current to flow through only one panel feed at a time, in another implementation, a separate current source can be implemented to inject a known quantity of current into each corresponding panel feed. A known current is used because solar irradiance is not constant, and therefore the current from each panel feed is not constant and an unreliable for use in measuring resistance. Moreover, each string will not produce an equal current because the strings can be installed at different distances from the combiner 102 and the conductors or cables connecting the strings to the combiner 102 have different lengths, and therefore different resistances. In addition, panels have different efficiencies and can be installed at different angles relative to a light source.

In the example shown, a state of the switches 122, 126, 136 is controlled via respective control lines 154, 156, 158 by the logic and control circuitry 160 to ensure the current is injected into one panel feed at a time. Of course, if multiple current sources are used, one for each panel feed, then the current can be injected simultaneously into each panel feed. However, current sources add components and complexity to the combiner 102, so if a single current source 152 is used, the logic and control circuitry 160 instructs via the control lines 154, 156, 158 the first switch 122 to close while instructing the other two switches 126, 136 to remain open, allowing the known current to be injected into the first panel feed 110. The logic and control circuitry 160 measures the voltage across the first protection device 124 and uses that measured voltage along with the known quantity of current injected into the first protection device 124 to calculate a corresponding resistance of the protection device 124 and stores that resistance value. An alternate implementation is to use a known resistance device 128 as described above. By measuring the voltage difference between lines 146 and 148, the current can be calculated. This is a simpler construction because it eliminates the switch 126 and the current source 152, however it does not have the capability to perform self-calibration.

The logic and control circuitry 160 instructs the first switch 122 to open via the control line 154, and instructs the second switch 126 to close via the control line 156, allowing the known current to flow into the second panel feed 112. Again, the logic and control circuitry 160 measures the voltage across the circuit breaker 130 via the voltage lines 148, 140, and uses the known quantity of current to calculate a corresponding resistance of the protection device 130 and stores that resistance value. The logic and control circuitry 160 continues to instruct all switches to open and close in a sequence until the circuitry 160 instructs the final switch 136 to close via the control line 158 (while all other switches are instructed to remain open), allowing the known current to flow into the last panel feed 114. The circuitry 160 measures the voltage across the resistor 138 via the voltage lines 150, 140, and uses the known quantity of current injected into the resistor 138 and the measured voltage to calculate a corresponding resistance of the resistor 138 and stores that resistance value. Alternately, the value of the resistor 138 can be stored in the logic and control circuitry 160.

The combiner includes a positive terminal 162 and a negative terminal 164, which are connected to the inverter 116 or to a downstream combiner. The negative terminal 164 is connected to the PV panels 104a, 106a, 108a, and the positive terminal 162 is connected to the DC switch 142 for receiving the composite DC current when the DC switch 142 is closed.

The combiner 102 can further include a communications module 166 connected to an optional interface 168, an optional alarm module 170, and an optional local display 172. Although the logic and control circuitry 160, the communications module 166, the alarm module 170, and the local display 172 are shown housed within the combiner box 102 in FIG. 1, they can be housed outside of the combiner box 102 and connected to a printed circuit board 174 within the combiner 102.

Figure 3:
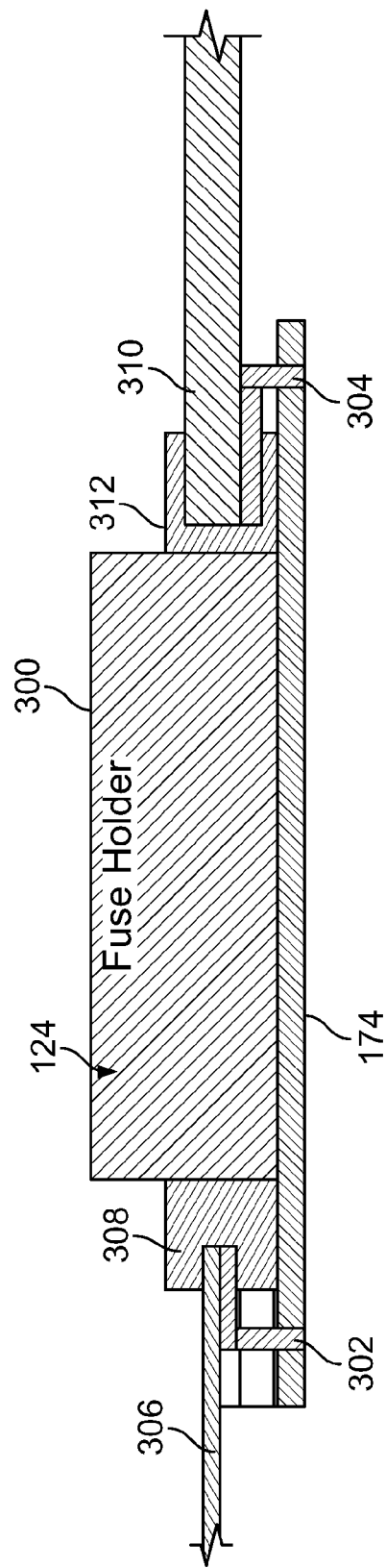
FIG. 3 is a side view of fuse holder that secures the fuse shown in FIG. 1 to the printed circuit board and electrically connects the fuse via corresponding first and second electrical conductors to the printed circuit board so that the voltage across the fuse can be measured.

The printed circuit board (PCB) 174, an example of which is shown in FIG. 3, has disposed thereon at least the protection devices 124, 130, 134 for each of the panel feeds 110, 112, 114. In FIG. 1, the PCB 174 further includes the switches 122, 126, 136, the blocking diodes 120, 132, and the resistive elements 128, 138, though in other implementations, these components need not be disposed on the PCB 174. An advantage of the present disclosure is that in some implementations, no additional or new components need to be added to an existing combiner. All combiners include a protection device, such as a fuse or circuit breaker, for each panel feed to protect each PV panel string, so the only additional components needed are voltage line connections across the protection devices, such as the protection device 124. An example of such connections is shown and described in connection with FIG. 3.

Figure 2:
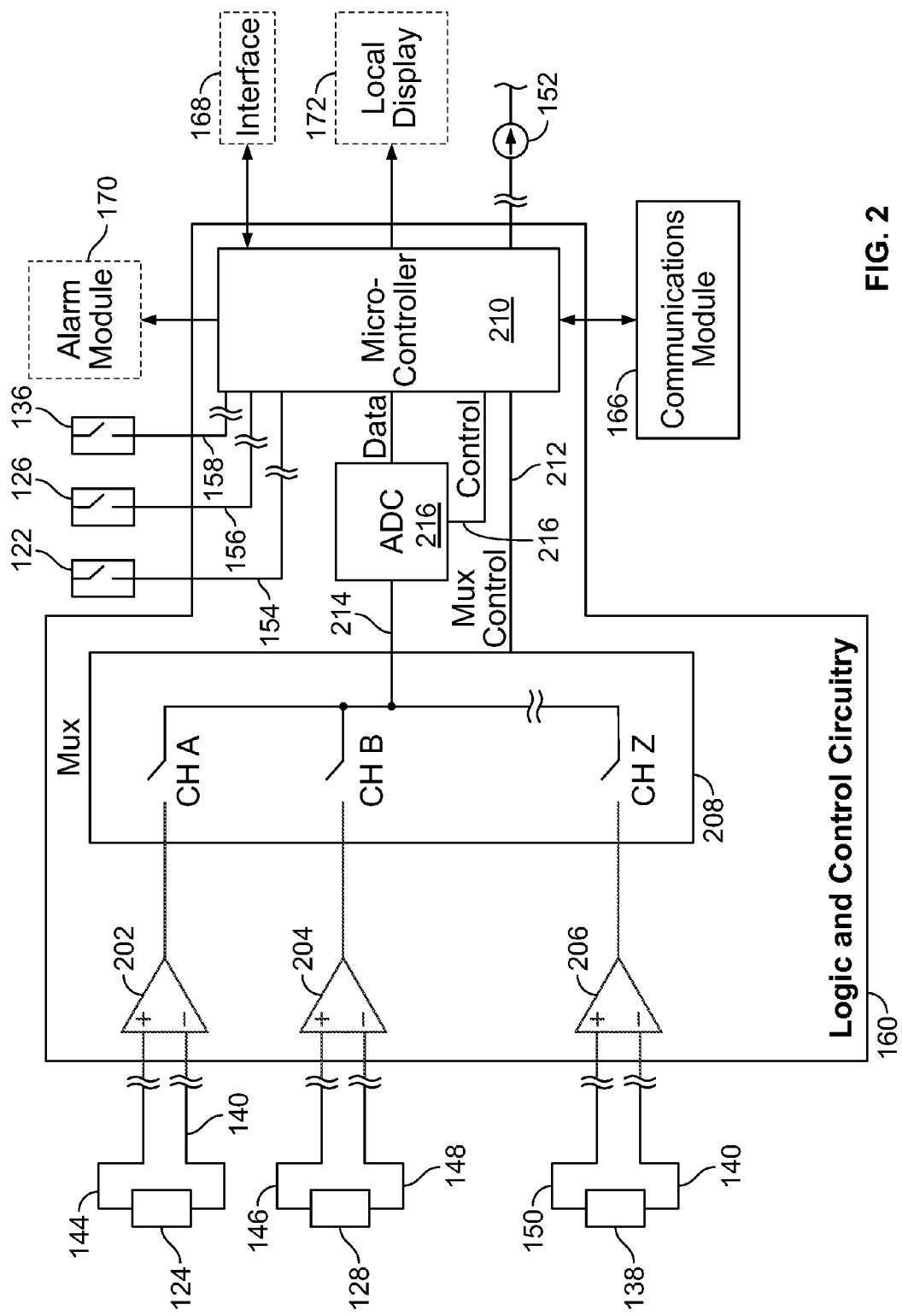
FIG. 2 illustrates a functional block diagram showing an exemplary configuration of the logic and control circuitry shown in FIG. 1.

FIG. 2 illustrates a functional block diagram showing an exemplary configuration of the logic and control circuitry 160 shown in FIG. 1. The lines 140, 144 are received as a voltage input indicative of a voltage across the protection device 124 to a first amplifier 202. The lines 146, 148 are received as a voltage input indicative of a voltage across the resistive element 128 to a second amplifier 204, and the lines 140, 150 are received as a voltage input indicative of a voltage across the resistive element 138 to a third amplifier 206. The amplifiers 202, 204, 206 conventionally amplify the voltage inputs and provide amplified voltage signals to a multiplexer 208, which is controlled by a multi-channel microcontroller or controller 210 via a MUX (multiplexer) control line 212. An output 214 of the multiplexer 208 is connected to an analog-to-digital (A/D) converter (ADC) 216, which is controlled by a control line 216 by the microcontroller 210. The A/D converter 216 conventionally converts the voltage output of the multiplexer 208 into a corresponding digital value representing the voltage and provides the digital value to the microcontroller 210.

The microcontroller 210 is also connected to the communications module 166, the optional alarm module 170, and the optional local display 172. The microcontroller 210 also controls the current source 152, and the switches 122, 126, 136.

FIG. 3 is a side view of fuse holder 300 that secures the fuse 124 to the printed circuit board 174 and electrically connects the fuse 124 via corresponding first and second electrical conductors 302, 304 to the printed circuit board 174 so that the voltage across the fuse 124 can be measured. A conductor 306 from the first panel feed 110 is secured by a first fuse screw terminal 308 and electrically connected to one terminal of the fuse 124. Correspondingly, a conductor 310 is connected to the busbar 140 and ultimately to the positive terminal 162 and is secured with the second electrical conductor 304 to the printed circuit board 174 by a second fuse screw terminal 312. The electrical conductors 302, 304 can be in the form of a clip that physically and mechanically mates with appropriate conductive traces on the printed circuit board 174 to tap the voltage across the fuse 124. As stated above, an advantage of certain aspects of the present disclosure is that existing components in a combiner can be used to tap a voltage indicative of the current flowing through each panel feed, without adding significant complexity to the existing design. Because the fuse 124 is already part of existing combiners, only the clips 302, 304 need to be inserted into the screw terminals 308, 312 for electrical coupling to the printed circuit board 174.

Figure 4:
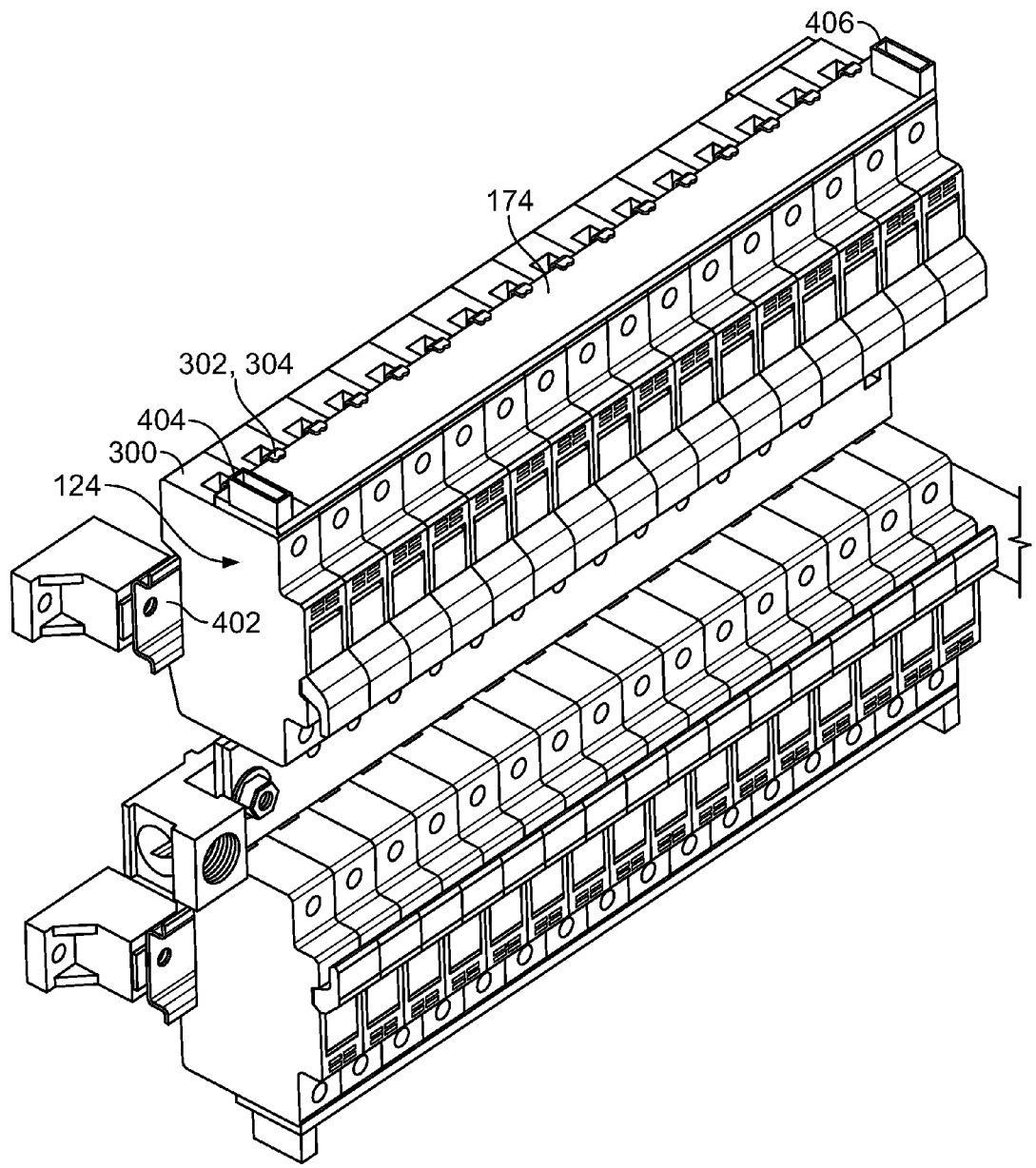
FIG. 4 is a perspective view of a fuse assembly having an arrangement of sixteen side-by-side fuse holders, attached to a rail and to the busbar.

FIG. 4 is a perspective view of a fuse assembly having an arrangement of sixteen side-by-side fuse holders, attached to a rail 402 and to the printed circuit board 174. Visible along a distal edge of the printed circuit board 174 are the clips or conductors 302 or 304, that electrically couple to traces 140, 144 on the PCB 174. Connectors 404, 406 on the printed circuit board 174 receive corresponding cables (not shown), which carry the voltage lines to the logic and control circuitry 160 and the control lines from the logic and control circuitry 160.

As mentioned above, the microcontroller 210 uses the measured voltages from a resistive element in each of the panel feeds to calculate energy produced by each string and also to monitor the performance of each string and to issue an alarm when a string's performance no longer satisfies a criterion. These details will be explained next.

Without a separate current sensor, which could be used to measure the current in each panel feed, the microcontroller 210 cannot determine the current (and correspondingly the power or energy produced by the string) without a resistance value of the resistive element across which the voltage measurement is taken. Not all resistive devices (such as fuses) have an equal resistance, even if made by the same manufacturer. Moreover, over prolonged deployment, the resistance of a protection device, such as a fuse, can change over time, so although the resistance can be measured before deployment and stored as a fixed value, this is not optimal because the resistance can degrade over time, which can render power calculations less accurate over time.

To ensure that a reliable resistance is accurately determined across each protection device or resistive element in each individual panel feed, the microcontroller 210 uses the current source 152 to inject a known quantity of current into each of the panel feeds 110, 112, 114 when the voltage measured does not exceed a predetermined minimum voltage level. The predetermined minimum voltage level can correspond to zero volts or substantially zero volts or a voltage level when no sunlight is present on the PV array (such as at nighttime). At nighttime, the voltage of the PV array may not be exactly zero, but it will be low enough to fall below a threshold that can be used as a basis for the microcontroller 210 to instruct the current source 152 to inject a known current into each panel feed 110, 112, 114 and measure the corresponding voltage across each protection device 124 or resistive element 128, 138 to calculate a corresponding resistance value for the protection device 124 or resistive element 128, 138. The resistance value is stored in a memory accessible by the microcontroller 210.

Using the stored resistance value, during the daytime when the PV array is producing energy, the microcontroller 210 uses the measured voltages and the stored resistance value to calculate a quantity of energy produced by each of the strings 104, 106, 108. Importantly, this calculation can be carried out for each string individually, allowing the microcontroller 210 to determine a precise energy production value for each string. These energy values can be displayed in real time on the local display 172 or communicated via the communications module 166 to a system or display external to the combiner 102.

Typically, the energy produced by the entire PV array is calculated, but aspects of this disclosure permit energy produced by each individual string to be calculated and displayed, without using any extra sensors, such as current transformers, on each panel feed. The alarm module 170 can indicate which individual one or ones of the strings 104, 106, 108 is underperforming relative to the performance of other ones of the strings, even when no alarm condition is present.

For example, because the energy production of each string can be individually determined, benchmark energy production thresholds can be established according to industry or other known specifications, and when the energy production of a particular string falls below a threshold, the logic and control circuitry 160 can indicate that the particular string is underperforming, even if its performance does not yet justify producing an alarm condition. Individual strings can underperform for one of several reasons, including the presence of a ground fault in the string, a loose wire in the string, solar tracking of the PV panel is misadjusted, and so forth, and the voltage measurements can be tracked to detect any of these underperforming conditions.

In addition to monitoring the energy produced by each individual string of PV panels, the microcontroller 210 can also cause an alarm to be issued when a performance of a monitored string becomes unacceptably poor. The logic and control circuitry 160 monitors the voltages across each protection device 124 or resistive element 128, 138, and when a monitored voltage (or other quantity using the monitored voltage, as will be explained next), satisfies an alarm criterion or criteria, the logic and control circuitry 160 causes an alarm to be indicated, such as on the alarm module 170. Instead of using the measured voltage, the logic and control circuitry 160 can monitor a different quantity, such as current or resistance or power, which quantity can be calculated from the measured voltage. The alarm criterion can be satisfied when the measured voltage or the calculated quantity decreases by more than a predetermined percentage and optionally for more than a predetermined time period.

Figure 5:
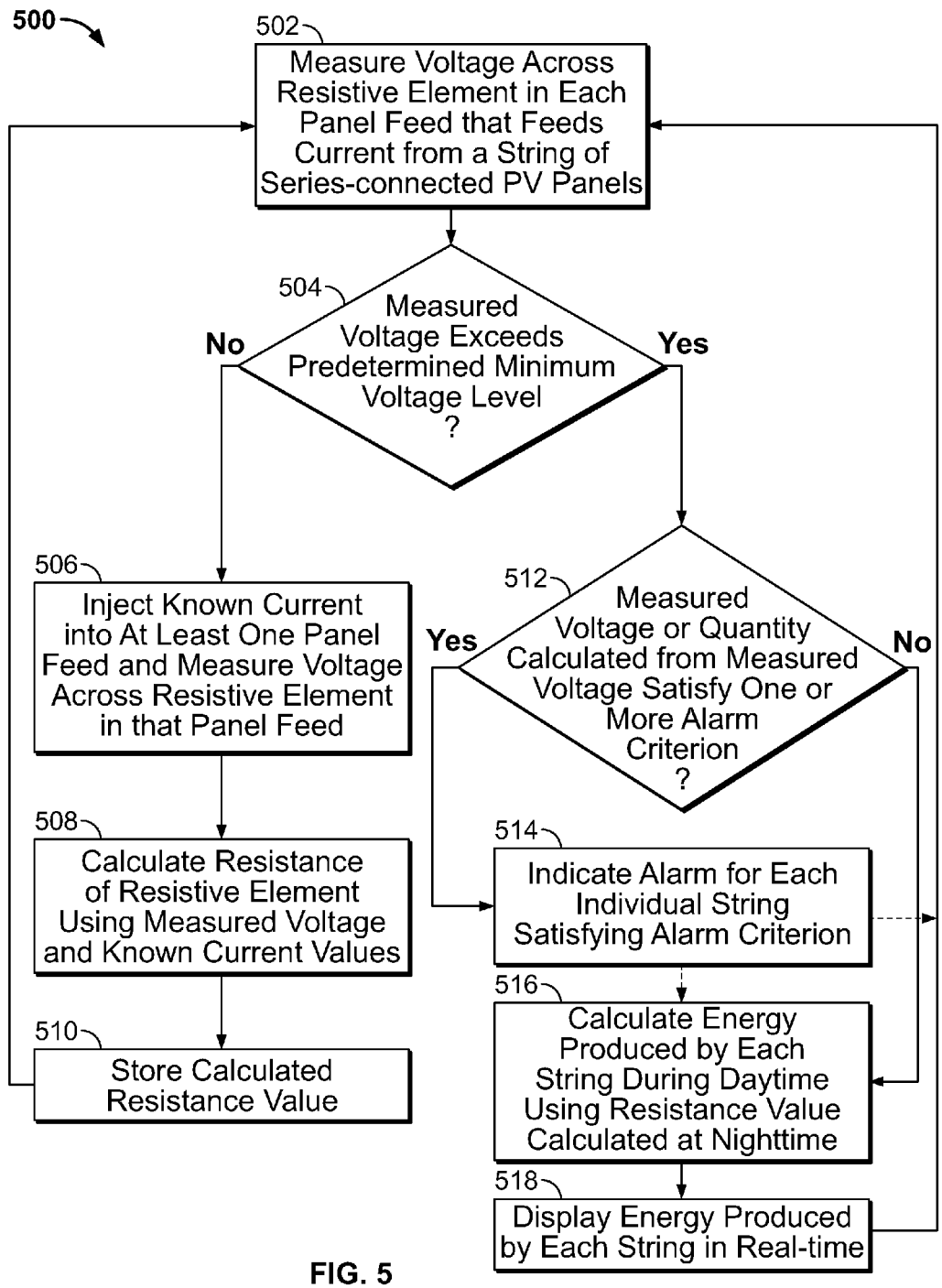
FIG. 5 illustrates an exemplary flowchart diagram of a method for monitoring individual strings of PV panels.

Turning now to FIG. 5, an example algorithm 500 for monitoring individual strings 104, 106, 108 of PV panels is shown. The algorithm 500 can be executed by, for example, the microcontroller 210. The algorithm 500 measures, in the combiner 102, a voltage across a resistive element (or protection device) in each panel feed that feeds current from a string 104, 106, 108 of series-connected PV panels 104a, 104b, 106a, 106b, 108a, 108b (502). The algorithm 500 determines whether the measured voltage for each panel feed exceeds a predetermined minimum voltage level, such as zero volts (504). If so, the algorithm 500 determines whether the measured voltage or a quantity calculated from the measured voltage satisfies one or more alarm criterion (512). If one or more alarm criterion is satisfied, an alarm is indicated for each of the panel feeds whose monitored voltage or calculated quantity satisfied the one or more alarm criterion (514). As stated above, the alarm criterion can include whether the voltage or the calculated quantity decreases by more than a predetermined percentage and optionally by more than a predetermined period of time. Optionally, the algorithm can then proceed to block 516 or return to block 502.

If the measured voltage or calculated quantity does not satisfy one or more alarm criterion, the algorithm 500 calculates the energy produced by each string 104, 106, 108 during the daytime using the resistance value calculated at nighttime, and the measured voltage (516). The algorithm 500 causes the energy produced by each string 104, 106, 108 to be displayed in real-time on the local display 172 or a display remote from the combiner 102 (518).

Returning to block 504, if the measured voltage does not exceed the predetermined minimum voltage level (e.g., zero volts or a voltage indicative of nighttime), the algorithm 500 injects a known current into at least one of the panel feeds 110, 112, 114 and measures the voltage across the resistive element (e.g., a fuse, such as the fuse 124, or a circuit breaker or protection diode, such as the element 128, or a resistor, such as the resistor 138) for that panel feed (506). As noted above, the algorithm 500 can cause the logic and control circuitry 160 to inject the known current into all panel feeds simultaneously or one at a time using the switches 122, 126, 136 to control which panel feed receives the current from the current source 152. The algorithm 500 calculates the resistance of the resistive element using the measured voltage and the known current value (508), and stores the calculated resistance value (510) for use during daytime voltage measurements.

The algorithm 500 does not need to calculate the resistance every night, for example. The blocks 506, 508, 510 can be carried out only once or can be carried out at predetermined or random intervals.

It should be noted that the algorithms including the algorithm 500 illustrated and discussed herein have various modules that perform particular functions and interact with one another. It should be understood that these modules are merely segregated based on their function for the sake of description and represent computer hardware and/or executable software code which is stored on a non-transitory computer-readable medium for execution on appropriate computing hardware, such as the microcontroller 210. The various functions of the different modules and units can be combined or segregated as hardware and/or software stored on a computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. An apparatus assembly for monitoring individual strings of series-connected photovoltaic (PV) panels that collectively form a PV array, comprising:
   a combiner box connected to the strings of PV panels, each of the strings being connected to a corresponding panel feed in the combiner box;
   a plurality of protection devices each connected to corresponding panel feed;
   a current source configured to inject a known current into a first of the panel feeds that receives current from a first of the strings;
   logic and control circuitry coupled to the panel feeds and to the current source, the logic and control circuitry being configured to:
      measure a voltage across a resistive element in series with the first panel feed,
      cause the current source to inject the known current into the resistive element responsive to a measured voltage across the first string not exceeding a predetermined minimum voltage level,
      calculate and store a resistance value representing a resistance of the resistive element as a function of the known current and the measured voltage; and
   output terminals for connection to a DC-to-AC inverter.

2. The apparatus assembly of claim 1, wherein the logic and control circuitry is housed inside the combiner box and includes a controller configured to calculate a quantity of energy produced by the first string according to a function that includes the stored resistance value and the measured voltage.

3. The apparatus assembly of claim 1, wherein the logic and control circuitry is further configured to monitor the voltage across the resistive element and responsive to the monitored voltage or a quantity calculated using the monitored voltage satisfying an alarm criterion, causing an alarm to be indicated.

4. The apparatus assembly of claim 3, wherein the alarm criterion includes whether the measured voltage or the calculated quantity decreases by more than a predetermined percentage.

5. The apparatus assembly of claim 4, wherein the alarm criterion further includes whether the measured voltage or the calculated quantity decreases by more than the predetermined percentage by more than a predetermined time period.

6. The apparatus assembly of claim 1, wherein the resistive element is a first of the protection devices.

7. The apparatus assembly of claim 1, wherein the resistive element is a blocking diode or a resistor connected in series with the first string.

8. The apparatus assembly of claim 1, wherein the resistive element is a resistor connected in series with a first of the protection devices in the first panel feed.

9. The apparatus assembly of claim 1, wherein the current source is configured to apply the known current into each of the panel feeds, the apparatus further comprising switches controlled by the logic and control circuitry, each of the switches being controlled to cause the known current to be injected into corresponding ones of the panel feeds one at a time.

10. The apparatus assembly of claim 1, wherein the logic and control circuitry includes:
    a multiplexer that receives the voltage measured across the resistive element; and
    an analog-to-digital converter that converts the voltage to a corresponding digital value representing the voltage.

11. The apparatus of claim 1, wherein the combiner box further includes a video display that displays in real time an amount of energy produced by each of the strings.

12. The apparatus of claim 1, wherein the combiner box further includes an alarm module that indicates which individual one or ones of the strings is underperforming relative to the performance of other ones of the strings.

13. The apparatus of claim 1, wherein the predetermined minimum voltage level is substantially zero volts.

14. The apparatus of claim 1, wherein the predetermined minimum voltage level corresponds to a voltage level when no sunlight is present on the PV array.

15. The apparatus assembly of claim 1, further comprising
a printed circuit board to which the protection devices are secured, each of the protection devices having a first terminal and a second terminal;
a first set of electrical conductors connecting each of the first terminals of each of the protection devices to the printed circuit board and a second set of electrical conductors connecting each of the second terminals of each of the protection devices to the printed circuit board, the first set of electrical conductors being positioned on the circuit board such that electrical conductors carrying current from each of the strings physically mate to the corresponding ones of the first set of electrical conductors; and
a connector on the printed circuit board connected to traces that are electrically coupled to a first of the terminals of each of the protection devices.

16. A method of monitoring individual strings of series-connected photovoltaic (PV) panels, the strings of PV panels forming a PV array, each string connected through a combiner to a downstream output of the array, the method comprising:
measuring, in a combiner box, a voltage across a resistive element in each of a plurality of panel feeds, each of the panel feeds configured to receive current from a corresponding string of series-connected PV panels;
detecting, in a first of the panel feeds, that the measured voltage does not exceed a predetermined minimum voltage level;
responsive to the detecting, injecting a known current into the first panel feed and measuring the voltage across the resistive element of the first panel feed;
responsive to the injecting and measuring, calculating a resistance of the resistive element in the first panel feed, as a function of the known current and the measured voltage, across the resistive element in the first panel feed;
storing the calculated resistance value of the first panel feed;
repeating the measuring, the detecting, the injecting, the calculating, and the storing for each of the remaining ones of the panel feeds; and
determining periodically the energy-producing performance of each string based on the corresponding calculated resistance values.

17. The method of claim 16, further comprising calculating a quantity of energy produced by a first of the strings feeding current to the first panel feed according to a function that includes the stored calculated resistance value and the measured voltage across the resistive element in the first panel feed.

18. The method of claim 16, further comprising calculating a quantity of energy produced by each of the strings according to a function that includes the stored calculated resistance value and the measured voltage across the corresponding resistive element in each of the panel feeds.

19. The method of claim 18, further comprising displaying in real time information indicative of the calculated quantity of energy for each of the strings.

20. The method of claim 16, further comprising:
determining for each of the panel feeds whether the monitored voltage or a quantity calculated as a function of the monitored voltage satisfies an alarm criterion; and
responsive to satisfying the alarm condition, indicating an alarm for at least one of the panel feeds whose monitored voltage or calculated quantity satisfied the alarm criterion.

21. The method of claim 20, wherein the alarm criterion includes whether the voltage or the calculated quantity decreases by more than a predetermined percentage.

22. The method of claim 21, wherein the alarm criterion includes whether the measured voltage or the calculated quantity decreases by more than the predetermined percentage by more than a predetermined period of time.

23. The method of claim 16, further comprising injecting the known quantity of current into each of the other panel feeds simultaneously with the injecting the known quantity of current into the first panel feed or one at a time in series.

24. The method of claim 16, wherein the resistive element is a diode, a resistor, a fuse, or a circuit breaker in series with the panel feed from the corresponding string.

25. The method of claim 16, wherein the predetermined minimum voltage level corresponds to a voltage level when no sunlight is present on the PV array.

26. A method of monitoring individual strings of series-connected photovoltaic (PV) panels, the strings of PV panels forming a PV array, each of the strings being connected through a combiner to a downstream output of the array, the method comprising:
measuring, in a combiner box, a voltage across a resistive element in each of a plurality of panel feeds, each of the panel feeds configured to receive current from a corresponding string of series-connected PV panels;
calculating a current as a function of the measured voltage and a known resistance of the resistive element; and
calculating a quantity of energy produced by each string based on the corresponding measured voltage and the calculated current.

* * * * *